United States Patent
Bales (10) Patent No.: US 7,802,182 B2
(45) Date of Patent: Sep. 21, 2010

(54) SYSTEM AND METHOD FOR PERFORMING VISUAL PROPERTY UPDATES

(75) Inventor: Christopher E. Bales, Boulder, CO (US)

(73) Assignee: BEA Systems Inc., Redwood Shores, CA (US)

( * ) Notice: Subject to any disclaimer, the term of this patent is extended or adjusted under 35 U.S.C. 154(b) by 839 days.

(21) Appl. No.: 11/132,898

(22) Filed: May 19, 2005

(65) Prior Publication Data

US 2005/0268230 A1 Dec. 1, 2005

Related U.S. Application Data

(60) Provisional application No. 60/573,776, filed on May 21, 2004.

(51) Int. Cl.
*G06F 17/00* (2006.01)
(52) U.S. Cl. .................. 715/235; 715/234; 715/200; 715/273
(58) Field of Classification Search ............. 715/234, 715/235, 236, 274
See application file for complete search history.

(56) References Cited

U.S. PATENT DOCUMENTS

| | | | |
|---|---|---|---|
| 6,317,142 B1 * | 11/2001 | Decoste et al. ............. 715/762 |
| 6,546,397 B1 * | 4/2003 | Rempell ........................ 1/1 |
| 7,000,184 B2 * | 2/2006 | Matveyenko et al. ........ 715/235 |
| 7,111,229 B2 * | 9/2006 | Nicholas et al. ............. 715/209 |
| 7,111,234 B2 * | 9/2006 | Peck et al. ................... 715/255 |
| 7,117,429 B2 * | 10/2006 | Vedullapalli et al. ........ 715/235 |
| 7,127,676 B2 * | 10/2006 | Linsey et al. ................ 715/738 |
| 7,143,344 B2 * | 11/2006 | Parker et al. ................. 715/236 |
| 7,178,101 B2 * | 2/2007 | Tunning ...................... 715/236 |
| 7,228,504 B2 * | 6/2007 | Jones et al. .................. 715/749 |
| 7,269,801 B2 * | 9/2007 | Kyle ............................ 715/855 |
| 7,337,393 B2 * | 2/2008 | Chartier et al. ............. 715/234 |
| 7,406,659 B2 * | 7/2008 | Klein et al. .................. 715/273 |
| 7,458,016 B1 * | 11/2008 | Desai et al. .................. 715/234 |
| 7,490,290 B2 * | 2/2009 | White et al. ................. 715/236 |
| 7,500,183 B2 * | 3/2009 | Kelly .......................... 715/234 |
| 7,536,641 B2 * | 5/2009 | Rosenstein et al. .......... 715/234 |
| 7,650,564 B2 * | 1/2010 | Kanzaki et al. ............. 715/205 |
| 7,716,574 B2 * | 5/2010 | Chartier et al. ............. 715/235 |
| 2002/0023112 A1 * | 2/2002 | Avital ......................... 707/513 |
| 2002/0069204 A1 * | 6/2002 | Kahn et al. .................... 707/10 |
| 2002/0091725 A1 * | 7/2002 | Skok ........................ 707/501.1 |
| 2003/0001885 A1 * | 1/2003 | Lin et al. ..................... 345/738 |
| 2004/0019849 A1 * | 1/2004 | Weng et al. ................. 715/513 |

(Continued)

OTHER PUBLICATIONS

Macromedia Dreamweaver MX 2004 Web Application Recipes; Joseph Lowery, Eric Ott; Pub. Nov. 24, 2003.*

*Primary Examiner*—Doug Hutton
*Assistant Examiner*—Benjamin J Smith
(74) *Attorney, Agent, or Firm*—Fliesler Meyer LLP (57) ABSTRACT

A preview system enables an administrator or designer of portal content to preview changes made to one or more documents in a portal. Upon modification of a document in the portal, a preview document is generated. The preview document utilizes a main portal archive for content, but the locally modified files for presentation elements. The preview document includes instructions such, that when it is viewed in a web browser, it can present the identity of style properties influencing a presentation of an area in the document by selecting the area.

22 Claims, 7 Drawing Sheets

U.S. PATENT DOCUMENTS

| | | | |
|---|---|---|---|
| 2004/0044785 A1* | 3/2004 | Bell et al. | 709/238 |
| 2004/0044966 A1* | 3/2004 | Malone | 715/530 |
| 2004/0046789 A1* | 3/2004 | Inanoria | 345/748 |
| 2004/0093563 A1* | 5/2004 | Pasquali | 715/513 |
| 2004/0148307 A1* | 7/2004 | Rempell | 707/102 |
| 2004/0148576 A1* | 7/2004 | Matveyenko et al. | 715/530 |
| 2004/0199543 A1* | 10/2004 | Braud et al. | 707/104.1 |
| 2004/0225672 A1* | 11/2004 | Landers et al. | 707/102 |
| 2004/0250204 A1* | 12/2004 | Isaacson | 715/517 |
| 2005/0229101 A1* | 10/2005 | Matveyenko et al. | 715/530 |
| 2006/0136822 A1* | 6/2006 | Kelly | 715/530 |
| 2006/0174188 A1* | 8/2006 | White | 715/501.1 |
| 2006/0212806 A1* | 9/2006 | Griffin et al. | 715/523 |
| 2007/0061710 A1* | 3/2007 | Chartier et al. | 715/523 |
| 2008/0140766 A1* | 6/2008 | Mohan | 709/203 |
| 2008/0141116 A1* | 6/2008 | Mohan | 715/236 |

* cited by examiner

SYSTEM AND METHOD FOR PERFORMING VISUAL PROPERTY UPDATES

PRIORITY CLAIM

The present application claims the benefit of:
U.S. Provisional Patent Application No. 60/573,776 entitled SYSTEMS AND METHODS FOR PORTAL 9.0, by Skip Sauls et al., filed on May 21, 2004, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates generally to the design of web content. The present invention relates more particularly to tools for representing web content.

BACKGROUND OF THE INVENTION

The design and creation of web portals, which comprise pages or groups of pages that allow a user to access a large number of centrally accessible applications and content, has become an increasingly complicated task. One of the more important challenges facing the developers of web portal products is the development of tools that provide easier approaches to designing and organizing web portal content. Particularly, there has been an interest in tools and forms of organization that enable sections of a portal to be developed independently, while still maintaining varying degrees of uniformity in style and presentation.

Currently, conventional tools enable the configuration of files governing presentation, but are difficult to use and unintuitive. Often, there is no centrally accessible mechanism for determining the interaction between multiple related pieces of configuration information. For example, many web portals use Cascading Style Sheets (CSS) for managing presentation. However, current implementations either do not allow an administrator to determine which style properties are affecting the presentation of a section or require specialized tools and editors, thus requiring multiple iterations of modification and testing before a preferred visual presentation can be achieved.

What is needed are improved techniques for modifying and editing web portal content.

BRIEF SUMMARY OF THE INVENTION

Systems and methods in accordance with one embodiment of the present invention can provide for assisting the editing of and providing a preview of edits made to a document.

In one embodiment of the present invention, methods for assisting editing of a document are provided. The methods include the steps of generating a preview document, the preview document comprising one or more sections, each section affected by one or more style properties, and storing, in the preview document, instructions configured such that if a selection of a section from among the one or more sections is submitted when the preview document is presented, an identity of the one or more style properties affecting the section is presented.

Another embodiment of the present invention provides systems and methods for previewing visual changes. The systems and methods includes a preview document. The preview document includes indicators for presenting one or more sections of the preview document, instructions configured such that if a selection from among the one or more sections is submitted when the preview document is presented, an identifier of one or more style properties affecting the section can be presented, and an administrative component configured to generate the preview document in response to a request.

Other features, aspects, and objects of the invention can be obtained from a review of the specification, the figures, and the claims.

DETAILED DESCRIPTION

In accordance with embodiments, there are provided mechanisms and methods for editing web content. These mechanisms and methods can enable an administrator or designer of portal content to preview changes made to one or more documents in a portal by creating a preview document. Upon modification of graphical settings for the portal, a preview document may be generated. In an embodiment, the preview document utilizes information from a main portal archive for non-presentation content, but locally modified files for presentation settings. The preview document also includes a user interface, which may be a Graphical User Interface (GUI) in an embodiment, to aid in configuration of presentation settings. The preview document can include instructions that enable the preview document to present the identity of style properties influencing a presentation of an area in the document in response to a selection of the area when it is viewed in a web browser. As used herein, the term "style properties" can refer to CSS properties, CSS classes, or any other image configuration setting that is provided in a structured style sheet and is used to influence the presentation of web content.

Figure 1:
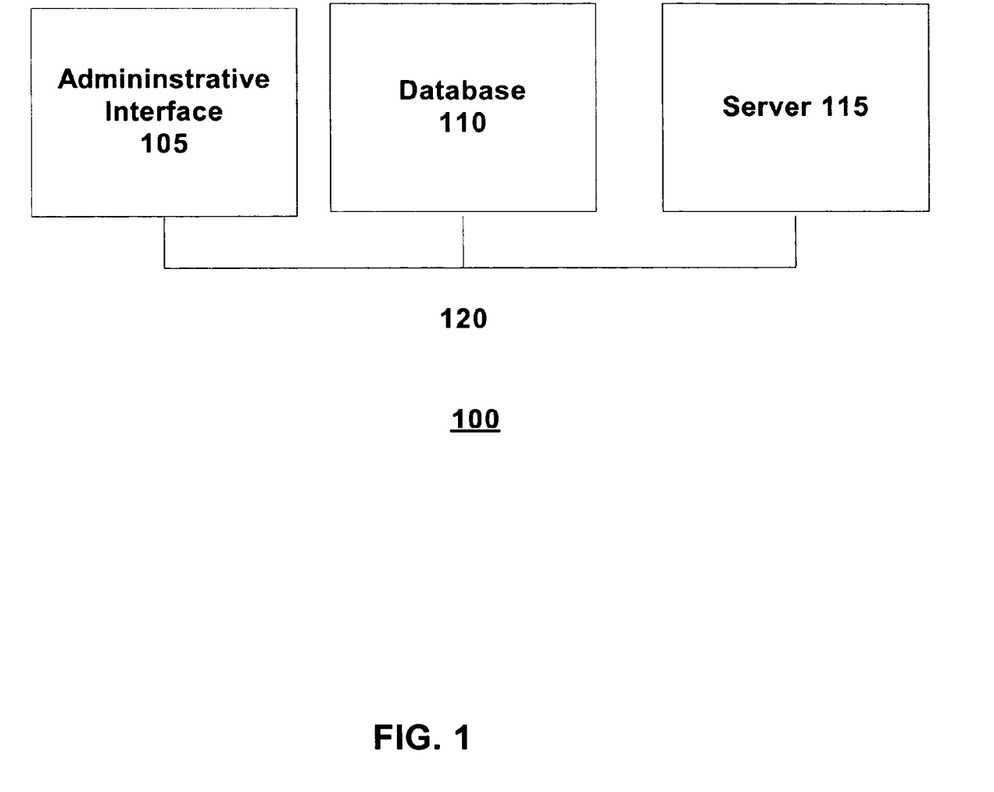
FIG. 1 illustrates one embodiment of a portal creation and administration system.

FIG. 1 illustrates one embodiment of a system for portal creation and modification. As shown in FIG. 1, system 100 includes an administrative interface 105, one or more databases 110, and a server 115 connected through a network 120. The network 120 can include but is not limited to public and/or private networks, wireless networks, optical networks, and satellite based communication links. Other suitable communication means can include but are not limited to random access memory, file system(s), distributed objects, persistent storage, and inter-processor communication networks. The server 115 is a server that supports a web portal and various applications, which may be implemented using Java™ or other similarly functional programming language. (Java™ is a trademark of Sun Microsystems, Inc.) In one embodiment, the server 115 utilizes WebLogic® Server, available from BEA Systems. The one or more databases 110 can include but is not limited to relational databases, object-oriented databases, file systems, or any other kind of persistent storage. In one embodiment, the databases store portal content that is manipulated through the administrative interface 105 and accessed by the server 115 during its operation. The administrative interface 105 is an interface that can be remote or local to the server 115 and that is used to configure, modify, and extend the server 115. In some embodiments, the administrative interface 105 acts as a client of the server when viewing and examining content on the server for the purposes of editing.

Figure 2:
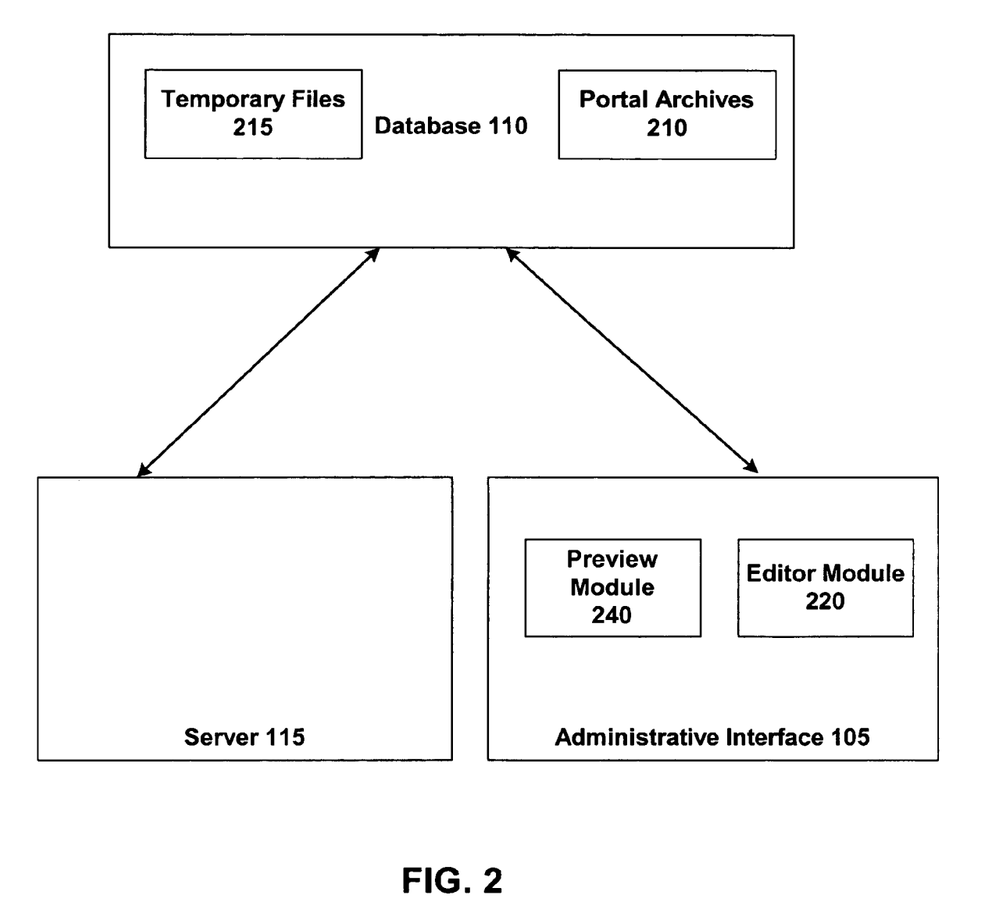
FIG. 2 illustrates a more detailed view of the interaction between a portal design system and portal content in an embodiment.

FIG. 2 illustrates a more detailed view of the interaction between a portal design system and portal content in an embodiment. The database 110 interacts with the server 115, and administrative interface 105. The database 110 contains files that are loaded by the server 115 to serve the web portal to remote users accessing the server. The database 110 stores one or more portal archives 210. The portal archives 210 are large aggregations of files containing all of the data, functional, and design elements for a portal. In some embodiments the portal archives 210 are Web ARchive (WAR) files. During a deployment stage, the server 115 utilizes the archive files to generate the portal. While in the present embodiment the portal files are stored in archives, in alternate embodiments, different configurations can be used. The database 110 additionally includes temporary files 215. The temporary files 215 are files that are edited when a user of the administrative interface 105 is making changes to the portal. The temporary files can be viewed and tested to verify that they appear as intended. The temporary files 215 can then be loaded into the portal archives 210, replacing some of the existing files, to update the portal.

The administrative interface 105 used to access and modify the temporary files 215 and portal archives 210. The administrative interface 105 includes an editor module 220, and a preview module 240. The editor module 220 is configured to modify images and portal content stored in the temporary files 215. The editor module 220 can modify image characteristics, style properties, and other characteristics related to portal presentation. In some embodiments, the editor module 220 includes text editing capability for modifying configuration files and file copying/replacement functionality for replacing graphical and image files. In some embodiments, the editor module 220 includes a user interface, such as a GUI, configured to present style sheet hierarchies structurally.

The preview module 240 is configured to generate a preview document. Preview documents are versions of documents such as pages in the web portal that are used to determine the effects of modifications to graphical elements. Preview documents utilize the portal archives 210 for non-presentation characteristics, but the temporary files 215 for presentation characteristics. In some embodiments, certain non-presentation information (e.g., HTML code) is copied from the corresponding version of the preview document in the portal archives to generate preview documents. The use of preview documents enables an administrator to determine the effects of changes to graphical settings without actually updating the portal archives 210.

The preview module also stores instructions in the preview document. These instruction are configured such that when the document is viewed, a graphical interface is created that returns a style property affecting the presentation of a section in response to a selection of the section. In some embodiments, this information is presented in the form of a graphical overlay. In one embodiment, these instructions are javascript instructions that can be run on a web browser.

Figure 3:
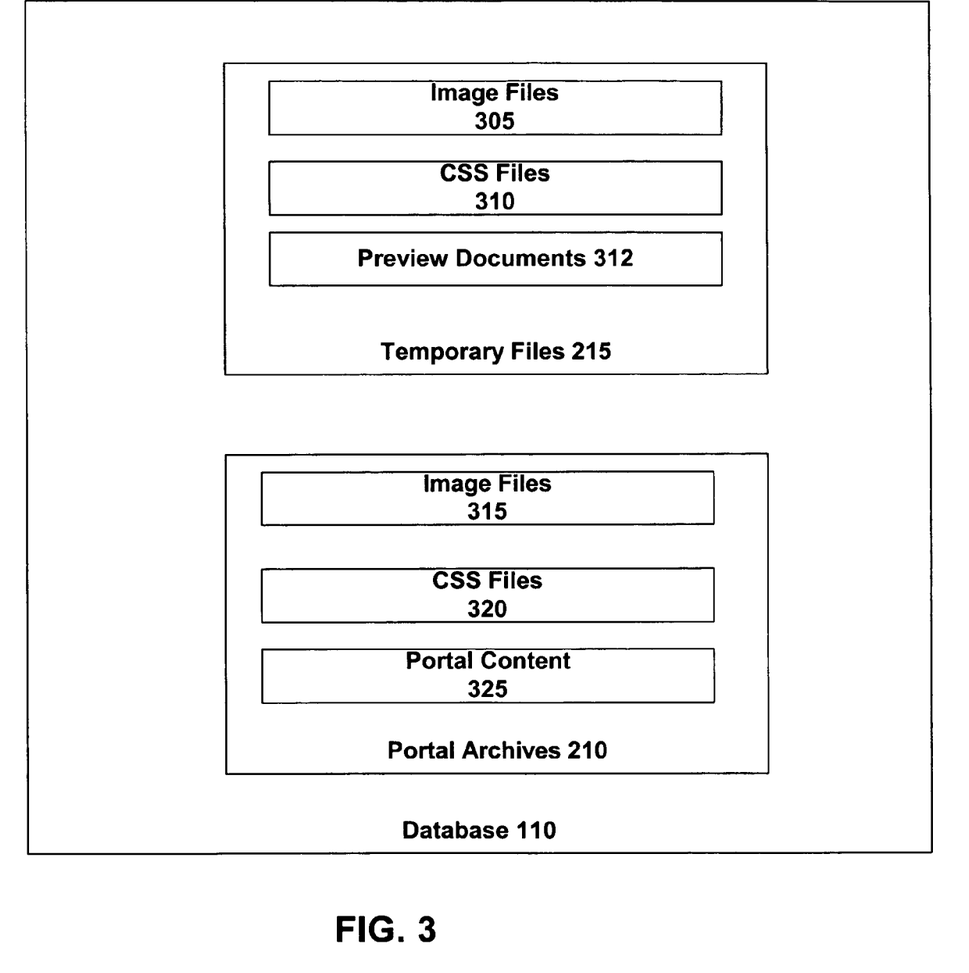
FIG. 3 illustrates a more detailed view of files storing portal content in an embodiment.

FIG. 3 illustrates a more detailed view of files storing portal content in an embodiment. The temporary files 215 include image files 305, CSS files 310, and preview documents 312. The portal archives 210 include image files 315, CSS files 320, and portal content 325.

The portal archives 210 are aggregations of portal content and design configuration information that, when deployed by the server module 235, enable the portal to be viewed by a client system. In some embodiments, the portal archives comprise Web ARchive (WAR) files. The portal archives can include image files 315. The image files 315 comprise graphics and other images that are presented as sections of web pages within a portal. The portal archives 210 additionally include CSS files 330. The CSS files 330 list style properties for differing sections of the portal. These style properties can include colors, font types, sizes, colors, and spacing, border widths, placement, and spacing, page organization and structure characteristics, and any other characteristics being configured. The CSS files 330 are typically organized as a listing of properties, with each property associated with a particular visual characteristic (e.g., title fonts, body fonts, background colors, etc) and a listing of values associated with that property (e.g., Times New Roman, blue). CSS files can be organized hierarchically with particular CSS files setting properties for the whole portal or larger subsections of the portal and lower order CSS files setting properties for particular pages. CSS files can include priority values that are used to govern conflicts between CSS files at different levels of the hierarchy. CSS files can include a main.css file that governs priorities for the portal as a whole. While in the present embodiment, CSS files are used, in alternate embodiments; other types of files or manners of persisting information can be used to govern style properties for the portal.

Illustrated below is one example of a CSS document setting characteristics for the way text, backgrounds, graphics, and margins are set in a web page. The fields in this document could be used to set document design at varying levels within a portal hierarchy, such as for the entire portal, for a single book (group of associated pages), or for a single page. The various subheadings in the CSS file refer to the page sections (e.g, body, unvisited links, visited links, headers) with the information in the subheadings indicating how fonts, text, graphics and the like should be presented.

```
/* basic elements */
body {
        font: 8pt/16pt georgia;
        color: #555753;
        background: #fff url(blossoms.jpg) no-repeat bottom right;
        margin: 0px;
        }
p {
        font: 8pt/16pt georgia;
        margin-top: 0px;
        text-align: justify;
        }
h3 {
        font: italic normal 12pt georgia;
        letter-spacing: 1px;
```

-continued

```
        margin-bottom: 0px;
        color: #7D775C;
        }
a:link {
        font-weight: bold;
        text-decoration: none;
        color: #B7A5DF;
        }
a:visited {
        font-weight: bold;
        text-decoration: none;
        color: #D4CDDC;
        }
a:hover, a:active {
        text-decoration: underline;
        color: #9685BA;
        }
```

Some CSS properties are attached to fixed elements of an HTML document such as <body> or <header> and affect the presentation of the document whenever these tags are detected. Other CSS properties can be attached independent of a particular HTML tag and are introduced by referencing the CSS property in the document itself. These properties can be referred to as classes.

The portal archives 210 also include portal content 325. The portal content 325 comprises the text, data files, portlets, HyperText Markup Language (HTML) files, and other content that provide the substance of the web portal.

The CSS files 310 and image files 305 in the temporary files 215 can be edited by a user of the admin system 105. The changes can be viewed using either traditional browsers or a specialized editing system. If the changes are acceptable to the designer, the temporary files 215 can be loaded to the archives 210, where they replace existing files. Preview documents 312 are generated when a user wishes to preview the appearance of the portal. The preview documents, which in some embodiments are HTML files corresponding to pages in the portal, include instructions to use the portal content 325 for data and functional content, but the temporary files for graphical elements. The preview documents 312 also include instructions that create a graphical user interface for providing style sheet information. In one embodiment, the preview documents are configured such that when rendered on a client they generate a graphical user interface that can provide style information in response to a user selection.

Figure 4:
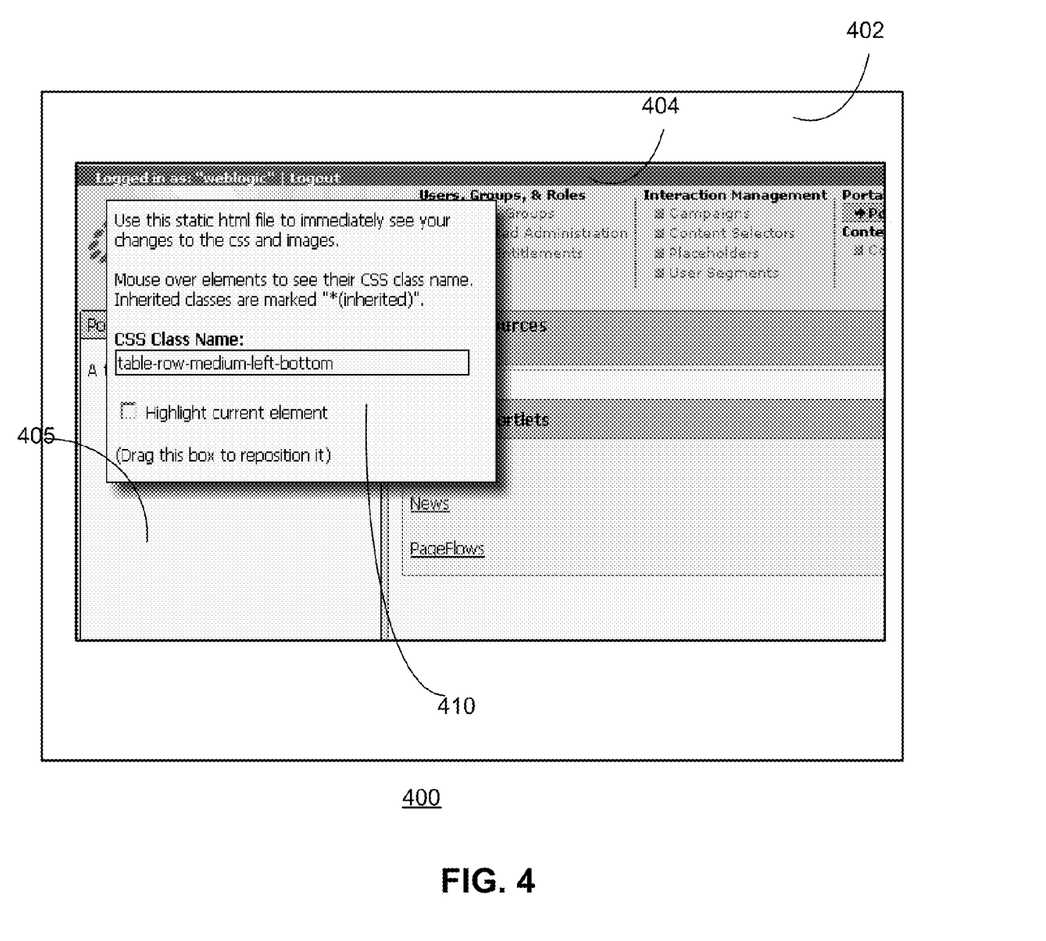
FIG. 4 illustrates a graphical user interface for previewing changes through a preview document in an embodiment.

FIG. 4 illustrates a graphical user interface for previewing changes to a portal in an embodiment. As shown in FIG. 4, a page 404 from a portal that is being previewed is displayed within a graphical user interface 400. Pages can be thought of as panels or panes that can be swapped into and out of a display region of the available portal real estate. While the page illustrated herein occupies a full display area, in alternate embodiments the display area can include multiple pages separated into panels. While in the present embodiment, a web page is being edited, in alternate embodiments other documents can be used.

In the present embodiment, the page being modified is an administrative portal page that is used for controlling a web server, in other embodiments, any number of pages from any type of portal can be used. The displayed page is one of the preview documents 312 and utilizes the image 305 and CSS files 310 from the temporary files for setting the presentation characteristics of the page, but the portal content 325 from the archives for non-presentation characteristics. In some embodiments, this is achieved by including references to the archived content and local image files in the source of the HTML document.

The page 404 includes also one or more elements 405, in this case, a table for which changes have been made. The element 405 is presented according to styles indicated in the CSS files 310 and utilizes images from the image files 305 that are located in the temporary files. However, the content (text, portlets, data, etc) is still extracted from the portal archives 210.

The page includes an overlay window 410. The overlay window indicates a style property affecting the presentation of the selected element. In some embodiments, the style property is a CSS property or class affecting the presentation of the element. In some embodiments, the overlay window 410 is generated when a mouse arrow or other pointing indicator is held over the element. The overlay window 410 can be generated through a selection of the element. By way of a non-limiting example, selection of an element can be accomplished with an input device such as a mouse, a motion detector, voice commands, hand or eye gestures, etc. In some embodiments, the graphical user interface is created by javascript code in the source code for the page, that when executed on a client such as the administrative interface 105, causes the interface illustrated herein to be generated. In alternate embodiments, other mechanisms for providing this type of style sheet feedback can be utilized.

Figure 5:
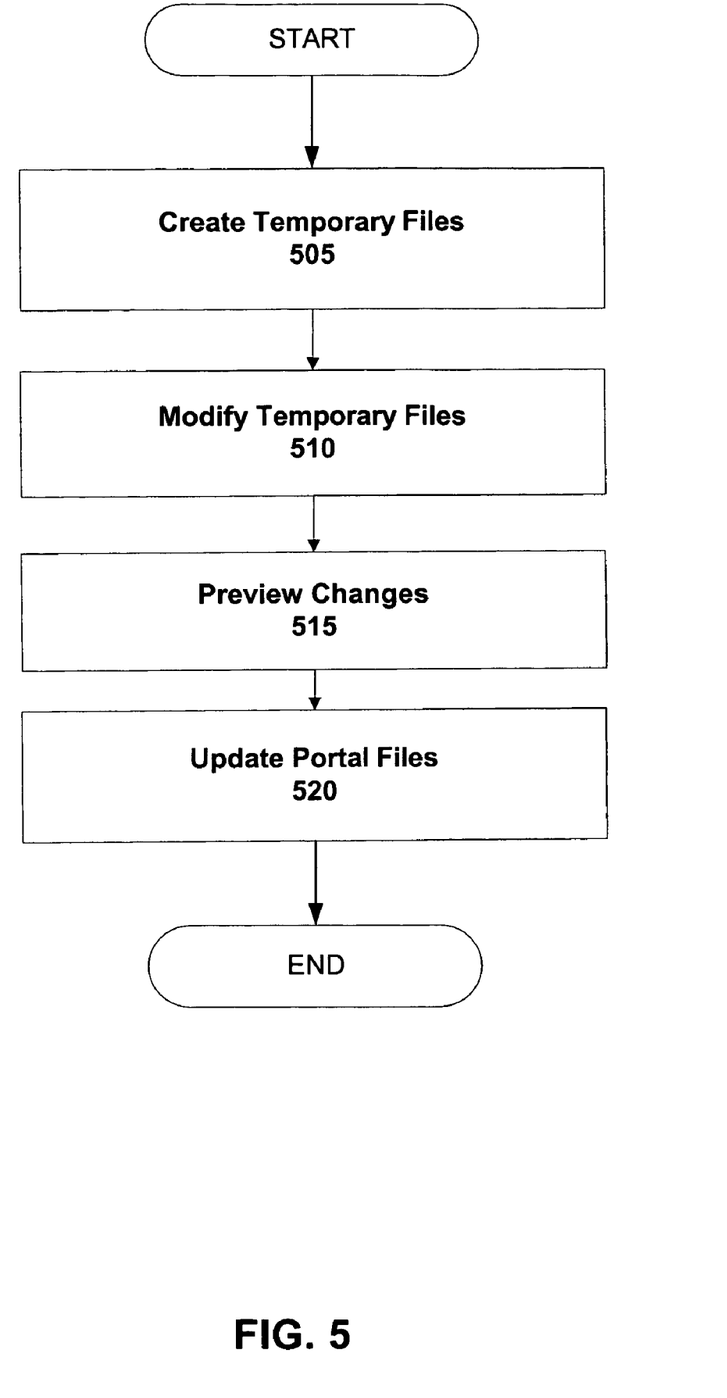
FIG. 5 is a flow chart illustrating a process for updating changes on a portal in an embodiment.

FIG. 5 is a flow chart illustrating a process for updating changes on a portal in an embodiment. In block (505) the temporary image 305 and CSS 310 files are created. In one embodiment, the temporary files 215 are created by copying the image 315 and CSS 320 files from the portal archives 210. In some embodiments, the temporary image 305 and CSS 310 files reside continually on the file storage and are modified each time updates are made. In yet a further embodiment, an editing system automatically copies the archived image 315 and CSS files 320 to generate the temporary files when a user begins an editing session.

In block (510) one or more of the temporary files are modified. In some embodiments, the image and CSS files are edited with a dedicated portal content editor. In alternate embodiments, they can be edited with standard text and image editors.

In block (515) the changes are previewed. Previewing changes comprises generating and displaying the preview page illustrated by FIG. 4. In some embodiments, the user specifies a document within the portal to be used to generate the preview document. In alternate embodiments, one or more default pages may be used. The temporary files 215 are used for setting the visual characteristics of the displayed page, whereas the portal content 325 provides the non-presentation content for the page. Processing illustrated by block (515) and block (510) can be repeated multiple times. For example, a user could use the graphical user interface in FIG. 4 to preview changes and obtain information about which CSS files are influencing the presentation of a particular section, use this information to modify the CSS files, and then view the effect of the modification.

In block (520) the changes are accepted. Acceptance processing comprises initiating a copying process to replace the image 315 and CSS 320 files in the portal archives with the current temporary image 305 and CSS 310 files so that the new presentation settings are used. In some embodiments, the preview page 400 can prompt the user to accept changes.

Figure 6:
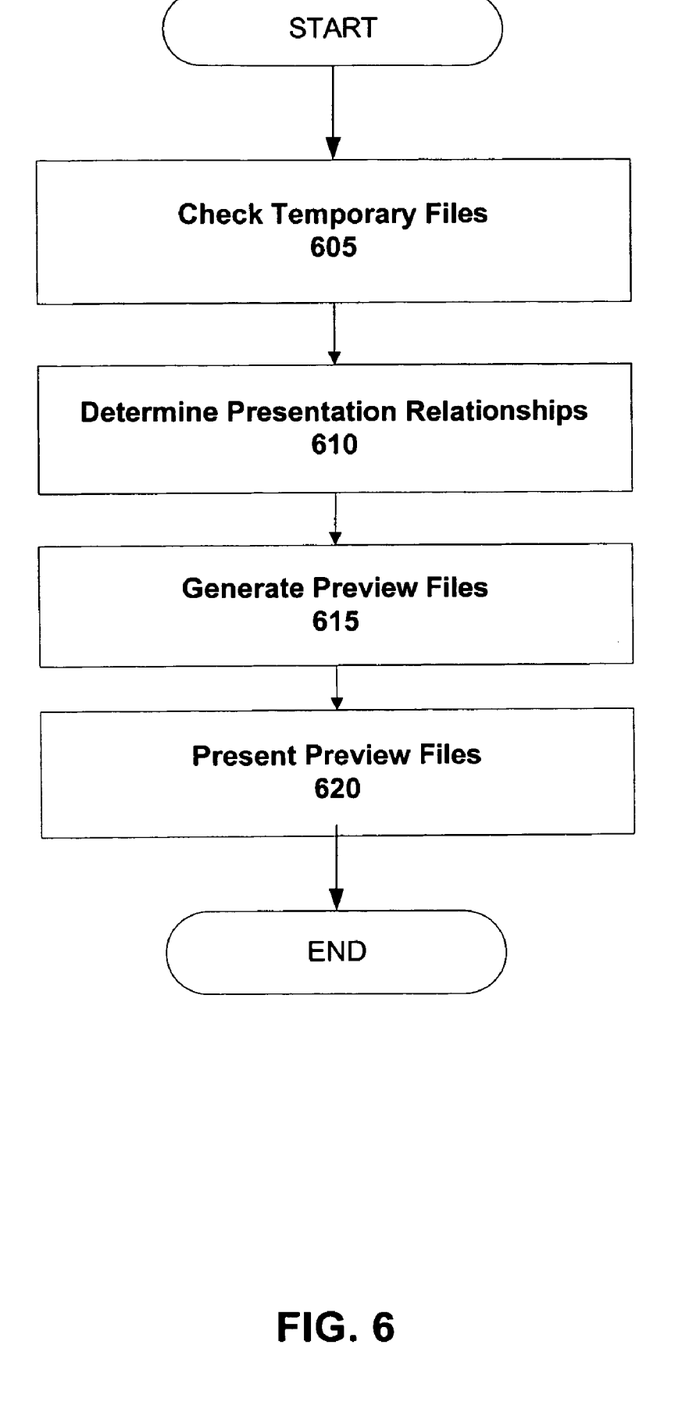
FIG. 6 is a flow chart illustrating a process for generating a preview document in an embodiment.

FIG. 6 is a flow chart illustrating a process for generating a preview document in an embodiment. In block (605) the system checks the temporary files, namely the image and CSS files and stores their relevant characteristics in memory.

In block (610) the presentation relationships are determined. Determining presentation relationships comprises determining which CSS files affect each section of the page for which image characteristics are being modified. In some embodiments, the system copies a version of a designated document being edited from the portal archives to use for this processing. In some embodiments, this processing is not performed during the creation stage, but instead performed dynamically by instructions in the generated preview document when the preview document is viewed.

In block (615) one or more preview documents is generated. The preview documents include instructions such that when a selection is made of an element within the document, a style property affecting the presentation of the element is returned. In one embodiment, the instructions are javascript instructions that are executed on a client, which in this case is the administrative interface 105. In alternate embodiments, the instructions can be executed on the server 115.

Figure 7:
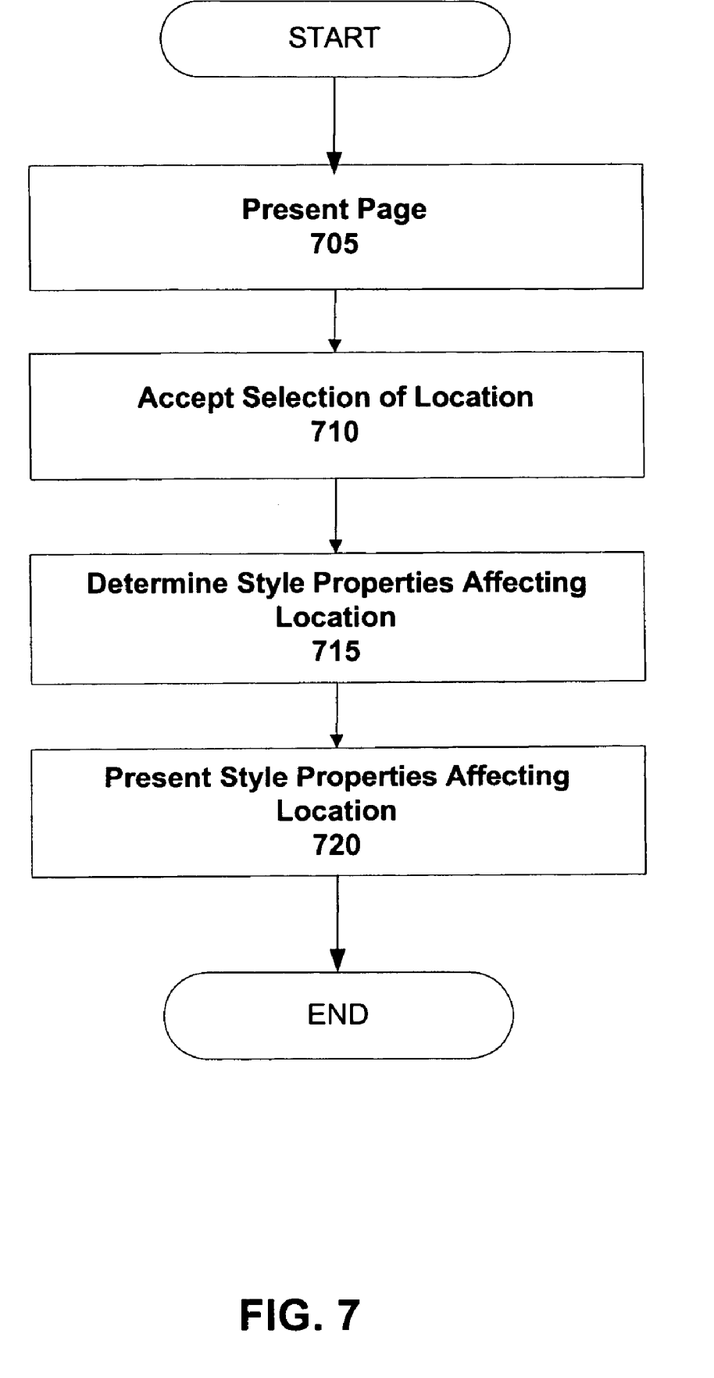
FIG. 7 is a flow chart illustrating a process for presenting style information in an embodiment.

FIG. 7 is a flow chart illustrating a process for presenting style information in an embodiment. In block (705) the page is presented. In one embodiment, the page is rendered on a browser on the administrative interface 105. In block (710) a selection of an element on the page is accepted. This element can be a graphic, a border, text, an empty area of the page, or any other part of the document that is influenced by style features. This selection can be submitted through a pointing indicator such as a mouse, keyboard interface, a voice interface, or any other interface type. In block (715) the style property affecting the selected area of the page is determined. The property can be from a page-specific style sheet or inherited from a higher level in the portal hierarchy. In some embodiments, this processing is performed dynamically by javascript or other code residing within the page. In alternate embodiments the determination can be made on the server. Alternately, during a page creation process, as illustrated by block (615) for example, the identities of the relevant properties can be stored as static content within the preview page.

In block (720) the system presents the identity of one or more style properties affecting the presentation of the selected area of the page. The style properties can be CSS classes or properties or some other form of style property. In some embodiments, the identity is presented in a graphical overlay as per FIG. 4. In some embodiments, additional information can be included. For example, the system can present supplementary information describing what characteristics the property relates to (borders, fonts, etc). Additionally, the presented information can include whether the property is inherited from a higher level style sheet or is particular to the page being edited.

In an embodiment and by way of example, a javascript code for performing the process illustrated in FIG. 7 follows:

```
function displayClass(evt)
{
    var inheritedStr = " ";
                        var hilightColor = "#ff0000";
                        //this must match hilightColor for strange Mozilla behavior
                        var hilightColorMoz = "rgb(255, 0, 0)";
                        //Get the event for IE or Mozilla
                        if(document.all)
    {
        classObj = event.srcElement;
    } else
    {
        classObj = evt.target;
    }
                        //object originally rolled over
                        var overObj = classObj;
                        //the backgroundColor of the original object
                        var origBkgd = overObj.style.backgroundColor;
                        //the className of the original object
                        var classStr = classObj.className;
                        //if the original didn't have a className, get from parents
                        while (classStr == null || classStr == " ")
                        {
                                classObj = classObj.parentNode;
                                if (classObj == null)
                                {
                                        classStr = "<<unknown>>";
                                } else
                                {
                                        classStr = classObj.className;
                                        inheritedStr =" *(inherited)";
                                }
                        }
                        //Display the class name
            document.getElementById("classNameBox").value = classStr + inheritedStr;
            //Highlight the background color of the original object
                        if(document.getElementById("hiliteCheckbox").checked &
    origBkgd != hilightColor & origBkgd != hilightColorMoz)
                        {
                                for(var i = 0; i < 100; i++)
                                {
                                        if(elt[i] == null)
                                        {
                                                elt[i] = overObj;
```

```
                                    eltBkgd[i] = origBkgd;
                                    overObj.style.backgroundColor =
    hilightColor;
                                    setTimeout("resetBackground(" + i +
    ");'",200);
                                    break;
                                }
                            }
                        }
                    }
        }
```

The javascript code presented is configured to provide a CSS class of a selected element, though in other embodiments, information for other types of style properties could be presented as well. When run in a client browser, such as a browser associated with the administrative interface 105, the code presented generates a graphical overlay indicating a CSS class affecting the presentation of a selected region of the page. In one embodiment, the graphical interface is similar to the one presented with regards to FIG. 4.

While the present invention is described with reference to an embodiment in which preview documents are created that include executable instructions written in the javascript programming language, the present invention is not limited to the javascript programming language and may be practiced using other programming languages, i.e., JSP and the like without departing from the scope of the embodiments claimed.

Other features, aspects and objects of the invention can be obtained from a review of the figures and the claims. It is to be understood that other embodiments of the invention can be developed and fall within the spirit and scope of the invention and claims.

The foregoing description of preferred embodiments of the present invention has been provided for the purposes of illustration and description. It is not intended to be exhaustive or to limit the invention to the precise forms disclosed. Obviously, many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

In addition to an embodiment consisting of specifically designed integrated circuits or other electronics, the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications.

Included in the programming (software) of the general/specialized computer or microprocessor are software modules for implementing the teachings of the present invention.

What is claimed:

1. A system embodied upon computer readable storage media for previewing visual changes of a web portal, the system comprising:

an administrative component that generates a preview document in response to a request, wherein the preview document is a web page, and wherein the administrative component provides portal configuration information that contains functional characteristics for the web portal and a set of temporary files that provide one or more presentation characteristics for the web portal;

a preview document that utilizes the portal configuration information for the functional characteristics of the portal and the temporary files for the presentation characteristics of the web portal, and wherein the preview document includes an instruction set that when processed by an application at a client renders the preview document in a web browser;

wherein when a cursor, at the web browser, is positioned over one of said one or more sections of the web portal, the instruction set is read and executed by the application to present, in a graphical overlay at the web browser, an identity of the one or more style properties affecting the one of said one or more sections while the cursor is positioned over the one of said one or more sections, wherein the one or more style properties affecting the section is derived from a structured style sheet, and wherein the identity of the one or more style properties affecting the section includes an indication of whether the one or more style properties is inherited; and wherein upon receiving a modification to the set of temporary files that changes the one or more style properties affecting the presentation characteristics of the web portal, a request is sent to accept modifications to the set of temporary files, and wherein accepting the modifications initiates a copy process to update the portal configuration information to include the set of temporary files as modified.

2. The system of claim 1, wherein the one or more style properties affecting the section comprise Cascading Style Sheet (CSS) classes.

3. The system of claim 1, wherein the instructions comprise instructions written in a scripting programming language.

4. The system of claim 1, wherein a name of the one or more style properties affecting the section is presented in the graphical overlay.

5. The system of claim 1, wherein the section comprises text.

6. The system of claim 1, wherein the identifier of one or more style properties affecting the section can be presented further comprises:
presenting a name of the one or more style properties affecting the section.

7. A method for assisting editing of a web portal, the method comprising:
providing portal configuration information that contains functional characteristics for the web portal;
providing a set of temporary files that provide one or more presentation characteristics for the web portal;
generating a preview document, wherein the preview document is a web page, and wherein the preview document utilizes the portal configuration information for the functional characteristics of the portal, and the temporary files for the presentation characteristics of the web portal, and wherein the preview document includes an instruction set that when processed by an application at a client renders the preview document in a web browser;
detecting, at the web browser, a cursor positioned over one of said one or more sections of the web portal, wherein the instruction set is read and executed by the application to present, in a graphical overlay at the web browser, an identity of the one or more style properties affecting the one of said one or more sections while the cursor is positioned over the one of said one or more sections,
wherein the one or more style properties affecting the section is derived from a structured style sheet, and
wherein the identity of the one or more style properties affecting the section includes an indication of whether the one or more style properties is inherited;
presenting the graphical overlay at the web browser to show the one or more style properties affecting the one of said one or more sections that has the cursor positioned over;
receiving a modification of the set of temporary files, wherein the modification changes the one or more one or more style properties affecting the presentation characteristic of the web portal, wherein the web portal includes one or more sections, each section affected by the one or more style properties; and
wherein a request is sent to accept modifications to the set of temporary files, and wherein accepting the modifications initiates a copy process to update the portal configuration information to include the set of temporary files as modified.

8. The method of claim 7, wherein the one or more style properties affecting the section comprise Cascading Style Sheet (CSS) classes.

9. The method of claim 7, wherein the instructions comprise instructions written in a scripting programming language.

10. The method of claim 7, wherein a name of the one or more style properties affecting the section is presented in the graphical overlay.

11. The method of claim 7, wherein the selection is submitted through a pointing device.

12. The method of claim 7, wherein the section comprises text.

13. The method of claim 7, wherein the identity of the one or more style properties affecting the section further comprises:
a name of the one or more style properties affecting the section.

14. The method of claim 7, wherein the preview document utilizes information from a main portal archive for non-presentation content.

15. A computer readable storage medium comprising instructions that when executed by a processor cause a system to:
provide portal configuration information that contains functional characteristics for the web portal;
provide a set of temporary files that provide one or more presentation characteristics for the web portal;
generate a preview document, wherein the preview document is a web page, and wherein the preview document utilizes the portal configuration information for the functional characteristics of the portal, and the temporary files for the presentation characteristics of the web portal, and wherein the preview document includes an instruction set that when processed by an application at a client renders the preview document in a web browser;
detect, at the web browser, a cursor positioned over one of said one or more sections of the web portal, wherein the instruction set is read and executed by the application to present, in a graphical overlay at the web browser, an identity of the one or more style properties affecting the one of said one or more sections while the cursor is positioned over the one of said one or more sections,
wherein the one or more style properties affecting the section is derived from a structured style sheet, and
wherein the identity of the one or more style properties affecting the section includes an indication of whether the one or more style properties is inherited;
present the graphical overlay at the web browser to show the one or more style properties affecting the one of said one or more sections that has the cursor positioned over;
receive a modification of the set of temporary files, wherein the modification changes the one or more one or more style properties affecting the presentation characteristic of the web portal, wherein the web portal includes one or more sections, each section affected by the one or more style properties; and
wherein a request is sent to accept modifications to the set of temporary files, and wherein accepting the modifications initiates a copy process to update the portal configuration information to include the set of temporary files as modified.

16. The computer readable medium of claim 15, wherein the one or more style properties affecting the section comprise Cascading Style Sheet (CSS) classes.

17. The computer readable storage medium of claim 15, wherein the instructions comprise instructions written in a scripting programming language.

18. The computer readable storage medium of claim 15, wherein a name of the one or more style properties affecting the section is presented in the graphical overlay.

19. The computer readable storage medium of claim 15, wherein the selection is submitted through a pointing device.

20. The computer readable storage medium of claim 15, wherein the section comprises text.

21. The computer readable storage medium of claim 15, wherein the identifier of one or more style properties affecting the section can be presented further comprises:

presenting a name of the one or more style properties affecting the section.

22. The method of claim 14, wherein the preview document, utilizes locally modified files for presentation settings.

* * * * *

UNITED STATES PATENT AND TRADEMARK OFFICE
CERTIFICATE OF CORRECTION

| | | |
|---|---|---|
| PATENT NO. | : 7,802,182 B2 | Page 1 of 1 |
| APPLICATION NO. | : 11/132898 | |
| DATED | : September 21, 2010 | |
| INVENTOR(S) | : Christopher E. Bales | |

It is certified that error appears in the above-identified patent and that said Letters Patent is hereby corrected as shown below:

On sheet 1 of 7, in Figure 1, Box No. 105, line 1, delete "Admininstrative" and insert -- Administrative --, therefor.

In column 11, line 51-52, in claim 7, after "one or more" delete "one or more".

In column 11, line 48, in claim 15, after "one or more" delete "one or more".

Signed and Sealed this
Sixteenth Day of August, 2011

David J. Kappos
*Director of the United States Patent and Trademark Office*